United States Patent
Suganuma

(10) Patent No.: US 8,966,139 B2
(45) Date of Patent: Feb. 24, 2015

(54) COMMUNICATION CONTROL APPARATUS, NETWORK, AND NETWORK SYSTEM

(75) Inventor: Shigeru Suganuma, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 13/253,225

(22) Filed: Oct. 5, 2011

(65) Prior Publication Data

US 2012/0096196 A1    Apr. 19, 2012

(30) Foreign Application Priority Data

Oct. 13, 2010    (JP) .................................. 2010-230333

(51) Int. Cl.
*G06F 5/00*    (2006.01)
*G06F 13/362*    (2006.01)

(52) U.S. Cl.
CPC .................................. *G06F 13/362* (2013.01)
USPC ......................................................... 710/39

(58) Field of Classification Search
None
See application file for complete search history.

(56) References Cited

U.S. PATENT DOCUMENTS 5,884,027 A * 3/1999 Garbus et al. ................. 709/250
2005/0246460 A1* 11/2005 Stufflebeam ................. 710/104

FOREIGN PATENT DOCUMENTS

JP    2005332316 A    12/2005

OTHER PUBLICATIONS

Jack Regula, Using Non-transparent Bridging in PCI Express Systems, Jun. 1, 2004 ps. 1-31.*

* cited by examiner

*Primary Examiner* — Henry Tsai
*Assistant Examiner* — Juanito Borromeo
(74) *Attorney, Agent, or Firm* — Sughrue Mion, PLLC

(57) ABSTRACT

A memory access request is received from a first lower-level device among a plurality of lower-level devices and, when an address of the memory access request is an address in a given range, the memory access request is converted into a setting request from the upper-level device to a second lower-level device among the lower-level devices, the second lower-level device corresponding to the address of the memory access request.

7 Claims, 9 Drawing Sheets

COMMUNICATION CONTROL APPARATUS, NETWORK, AND NETWORK SYSTEM

This application is based upon and claims the benefit of priority from Japanese patent application No. 2010-230333, filed on Oct. 13, 2010, the disclosure of which is incorporated herein in its entirety by reference.

BACKGROUND

The present invention relates to a communication control apparatus, a network, and a network system.

When LSI devices and the like are mutually connected, a high-speed serial bus is typically used due to limitations to a wiring length in a substrate, and PCI Express is widely used as an accepted standard. In PCI Express, a tree-structured network having one RC (Route Complex) as a base is usually constructed (e.g., Japanese Patent Application Laid-open No. 2005-332316).

When a plurality of PCI Express networks are connected, each network is connected to another network from an end point of the PCI Express network via an NTB (Non-Transparent Bridge).

However, since the NTB is an end point, there is a limitation that a configuration request cannot be issued because of a protocol of PCI Express. Consequently, for example, when two PCI Express networks are connected, the configuration request cannot be issued from a route complex of one of the networks to a device on the other network, and hence it is not possible to completely control the device on the other network.

When a plurality of PCI Express networks are connected, there are cases where mutual control is required. In general, a special message for requesting the execution of the request is sent to the route complex of the other network to generate the request by software. However, in such implementation, the intervention of a processor for controlling the route complex of the sending destination is essential. Accordingly, when the processor becomes unresponsive, there arises a problem that the route complex cannot be controlled from the sending source.

FIG. 9 illustrates a typical example in which PCI Express networks are connected by an NTB connection. In the NTB connection, a configuration request cannot be sent from a PCI Express bridge. Therefore, in the structure illustrated in FIG. 9, it is not possible to completely control an end device 85 on a board 71 side from a CPU 921 on a board 72 side. Similarly, it is not possible to completely control an end device 95 on the board 72 side from a CPU 821 on the board 71 side.

SUMMARY

An exemplary object of the present invention is to allow a lower-level device in a network to be controlled from an upper-level device in another network connected to the network by a non-transparent connection.

A communication control apparatus according to one aspect of the present invention is a communication control apparatus for controlling an access between an upper-level device and a plurality of lower-level devices including: a request reception unit configured to receive a memory access request from a first lower-level device among the lower-level devices; and a request conversion unit configured to convert the memory access request into a setting request from the upper-level device to a second lower-level device among the lower-level devices when an address of the memory access request is an address in a given range, the second lower-level device corresponding to the address of the memory access request.

EXEMPLARY EMBODIMENT

A description is given hereinbelow of exemplary embodiments of the present invention with reference to the drawings.

Figure 1:
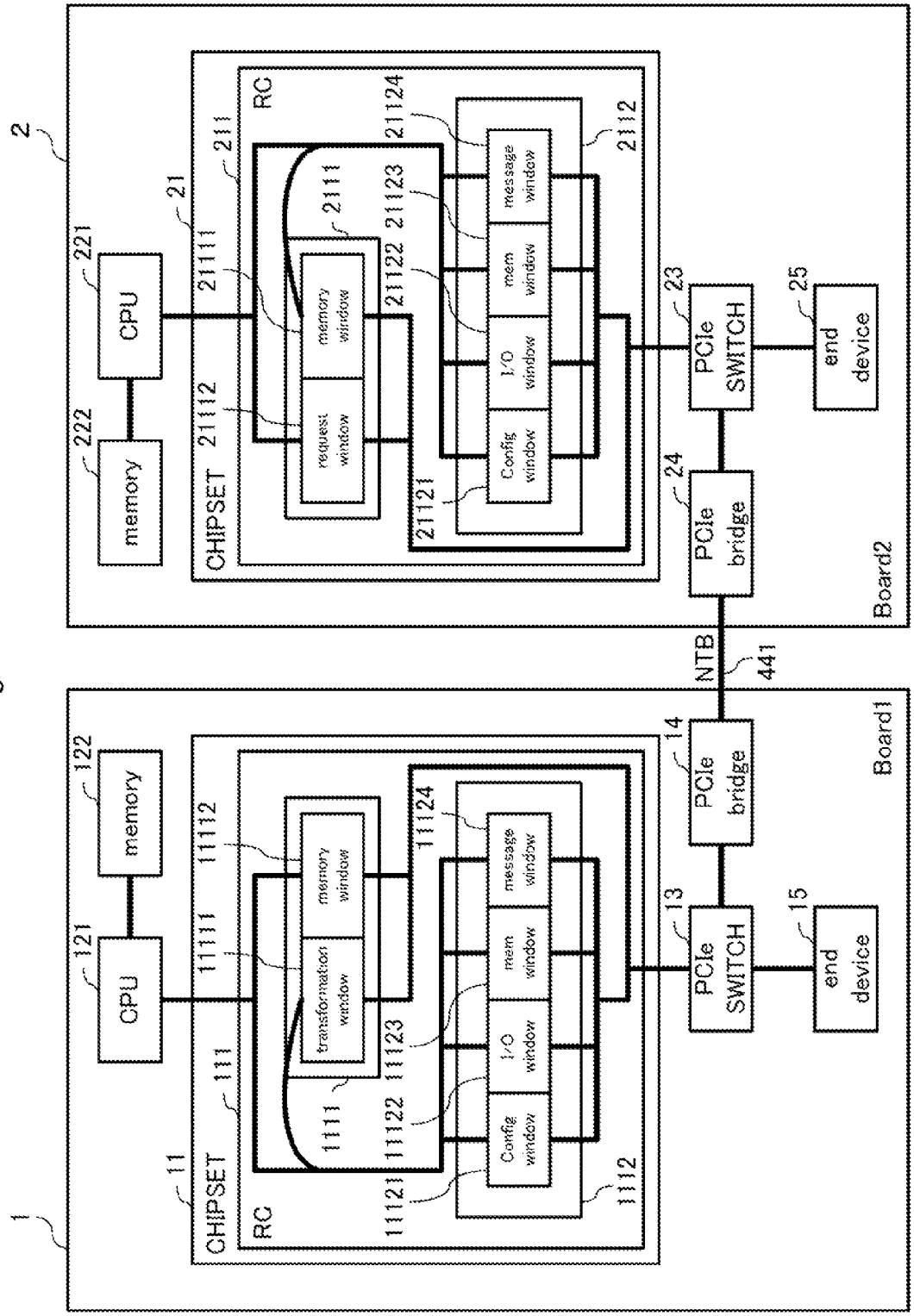
FIG. 1 illustrates a structure of a PCI Express network system in a first exemplary embodiment of the present invention.

FIG. 1 illustrates a structure of a PCI Express network system as a first exemplary embodiment of the present invention. As illustrated in FIG. 1, the PCI Express network system includes a board 1 and a board 2 each of which is constructed on the basis of a PCI Express network. The PCI Express network constructed in the board 1 is composed of a topology having a route complex 111 embedded in a chipset 11 as a base. Specifically, the route complex 111 is connected to a PCI Express bridge 14 and an end device 15 via a PCI Express switch 13. In addition, on the board 1, a CPU 121 for controlling the route complex 111 and a memory 122 for the CPU 121 are also mounted. The board 2 side has a similar structure, and there is constructed the PCI Express network in which a route complex 211 in a chipset 21 is used as the base, and a PCI Express switch 23, a PCI Express bridge 24, and an end device 25 are provided. Further, on the board 2, a CPU 221 for controlling the route complex 211 and a memory 222 for the CPU 221 are mounted. The boards 1 and 2 are connected using a non-transparent bridge (NTB) 441 disposed between the PCI Express bridges 14 and 24.

Figure 2:
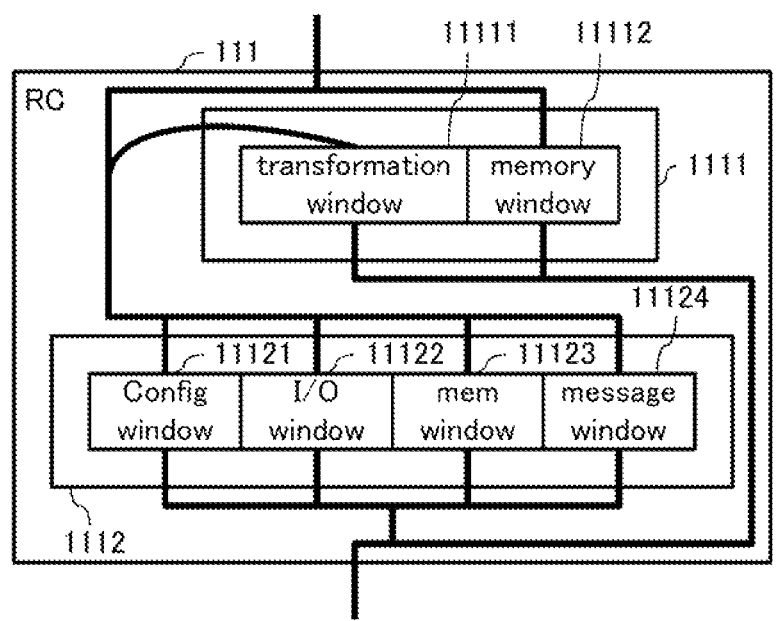
FIG. 2 illustrates an example of a structure of a route complex.

FIG. 2 illustrates an example of a structure of the route complex 111 of the board 1. As illustrated in FIG. 2, in the route complex 111, a request reception mechanism 1111 and a request conversion mechanism 1112 are implemented.

The request reception mechanism 1111 (request reception unit) has a function for receiving a memory request (memory access request) from a lower-level device. In the request reception mechanism 1111, space for executing various requests from the route complex 111 to a device on the board 1 is defined, and it is determined which one of windows in memory space including a transformation window 11111 and a memory window 11112 the request received from the lower-level device is hit in. In addition, the request reception mechanism 1111 has a function for transferring the memory request from the CPU 121 to the board 2 via the PCI Express bridge 14.

The request conversion mechanism 1112 (request conversion unit) has a function for converting the memory request into another request. The request conversion mechanism 1112 converts the request from the lower-level device or the CPU 121 into a request corresponding to a window in which the request is hit among windows including a configuration window 11121, an I/O window 11122, a memory window 11123, and a message window 11124. That is, the request conversion mechanism 1112 converts the request from the lower-level device or the CPU 121 into a configuration request (setting request), an I/O request, a memory request (memory access request), or a message request.

Specifically, the request conversion mechanism 1112 converts a memory write request into a configuration write request, an I/O write request, the memory write request, or a message write request in accordance with the address of the memory write request. In addition, the request conversion mechanism 1112 converts a memory read request into a configuration read request, an I/O read request, or the memory read request in accordance with the address of the memory read request.

Further, the request conversion mechanism 1112 has a function (completion notification reception unit) for receiving a completion (completion notification) for the converted request from the lower-level device, and a function (completion notification conversion unit) for converting the completion into a completion for the memory request from the lower-level device.

Specifically, the request conversion mechanism 1112 receives, from the request destination after the conversion, the completion for each of the configuration write request and the I/O write request among the requests converted from the memory write request, and returns the completion for the memory write request to the lower-level device as the request source. In addition, the request conversion mechanism 1112 receives, from the request destination after the conversion, the completion for the request converted from the memory read request, and returns the completion for the memory read request to the lower-level device as the request source.

Figure 3:
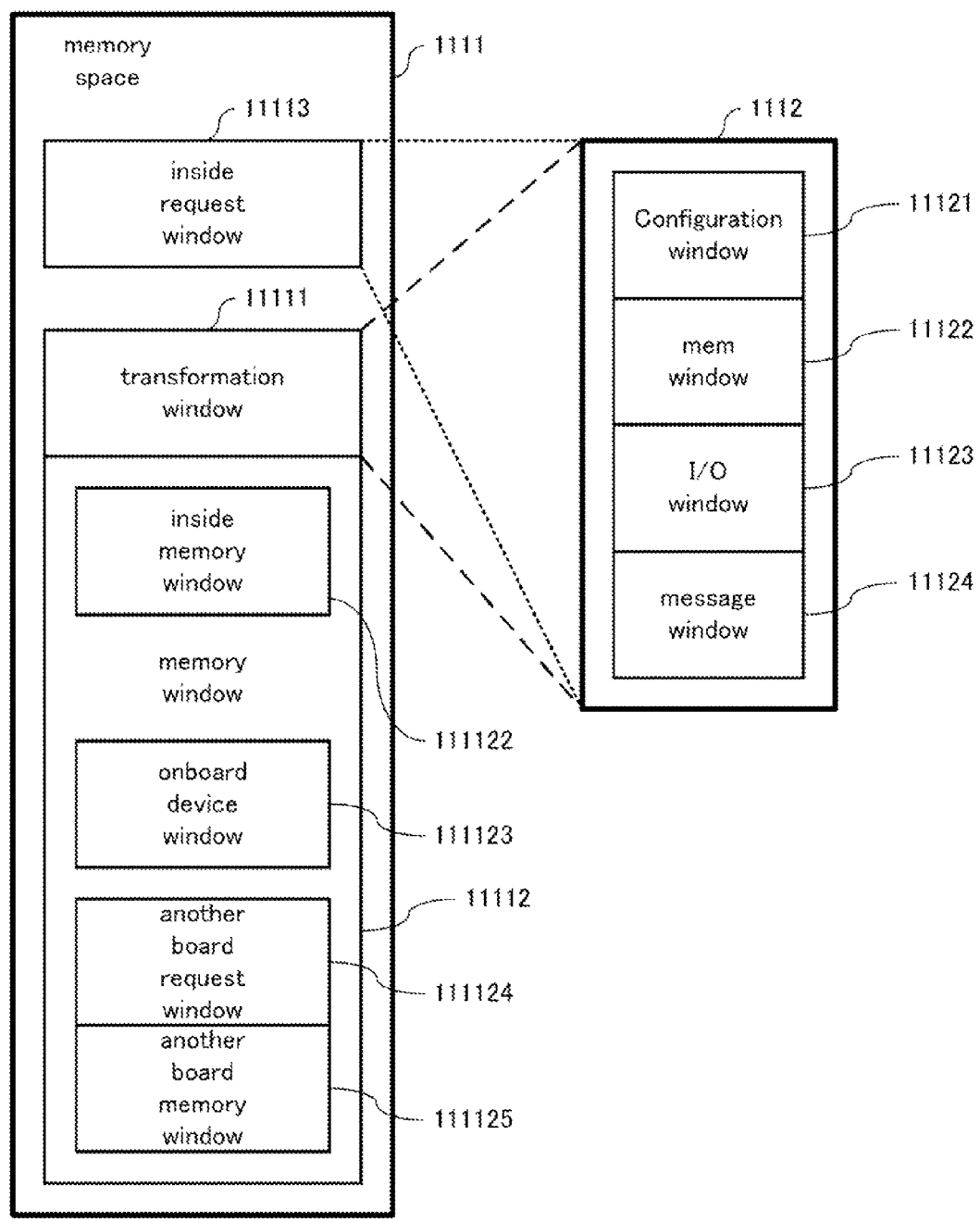
FIG. 3 illustrates an example of allocation of address space.

FIG. 3 illustrates an example of allocation of address space in the board 1. In FIG. 3, the address space defined in the request reception mechanism 1111 of the route complex 111 is the space for executing various requests to the device on the board 1 from the route complex 111, and includes the transformation window 11111, the memory window 11112, and an inside request window 11113. In the space, the inside request window 11113 is the address space for issuing the request to the device on the board 1 from the CPU 121 as the upper-level device of the route complex 111. Further, the memory window 11112 includes an inside memory window 111122, an onboard device window 111123, an another board request window 111124, and an another board memory window 111125.

The request reception mechanism 1111 checks whether or not the memory request from the lower-level device is hit in the address space of the transformation window 11111. Subsequently, when the memory request from the lower-level device is hit in the address space of the transformation window 11111, the request reception mechanism 1111 sends the request to the request conversion mechanism 1112.

The request conversion mechanism 1112 receives the request sent via the transformation window 11111 and the request from the CPU 121, determines which one of the configuration window 11121, the I/O window 11122, the memory window 11123, and the message window 11124 each of the requests is hit, and converts the request into the request corresponding to the window in which the request is hit.

Figure 4:
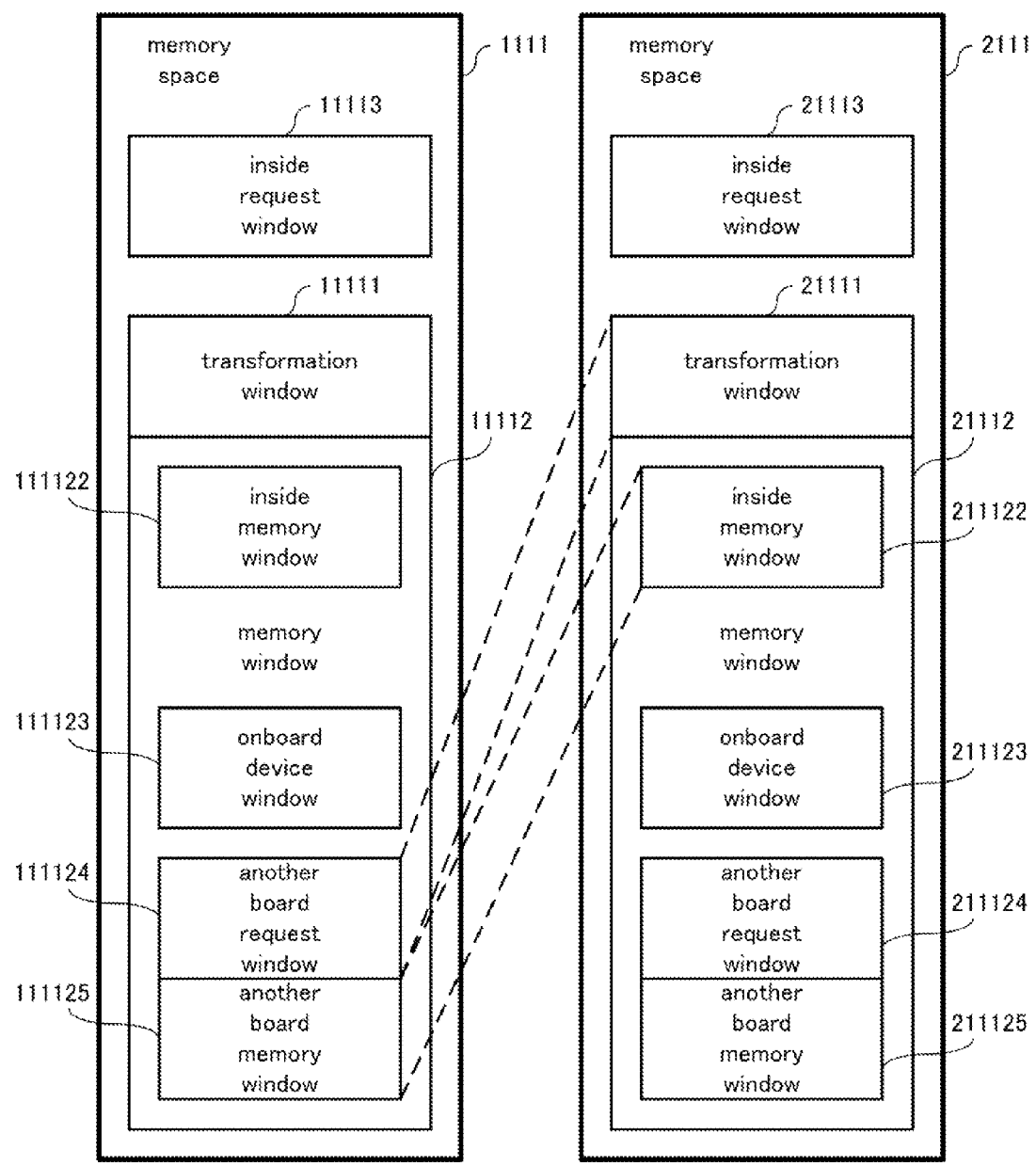
FIG. 4 illustrates an example of memory space used when an access is made to another board.

FIG. 4 illustrates an example of the memory space used when an access is made from the board 1 to the board 2. As illustrated in FIG. 4, as the memory space for sending the request from the board 1 to the board 2, the another board request window 111124 and the another board memory window 111125 are allocated. Similarly in the board 2, the memory space for accessing the board 1 is allocated.

When receiving a request corresponding to the space allocated to the another board request window 111124 and the another board memory window 111125, the request reception mechanism 1111 sends the request to the PCI Express bridge 14 via the PCI Express switch 13. The PCI Express bridge 14 performs address conversion in which the address space of the request is converted into the space of a transformation window 21111 or an inside memory window 211122 in a memory window 21112 on the board 2 side by NTB conversion.

Figure 5:
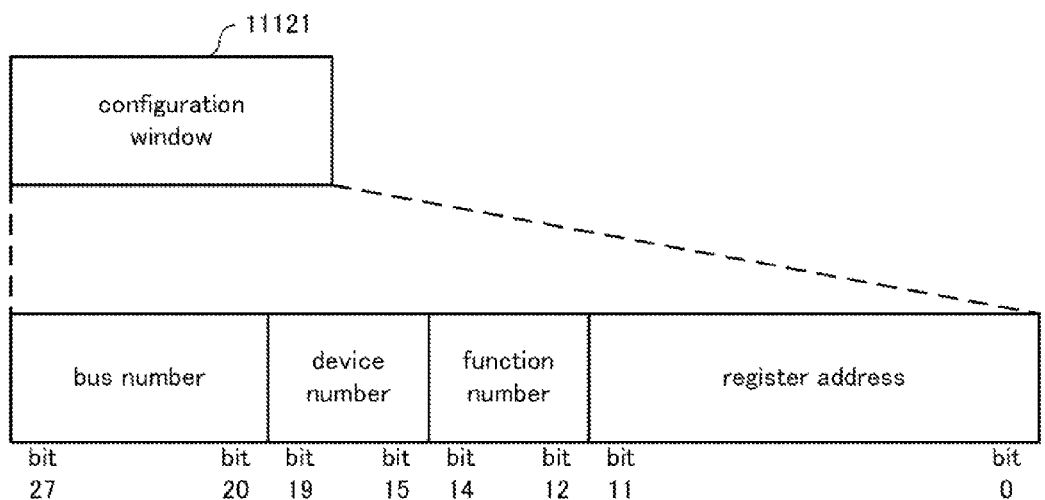
FIG. 5 illustrates an example of request conversion by using a configuration window.

FIG. 5 illustrates an example of the request conversion by using the configuration window 11121 in the request conversion mechanism 1112. In the example illustrated in FIG. 5, 28 bits of the address of the request inputted to the configuration window 11121 are used to generate a configuration command having a bus number, a device number, a function number, and a resister address. The configuration command generated in this manner is outputted to the PCI Express switch 13. With this operation, the configuration of the lower-level device corresponding to information set in the configuration command is executed.

Figure 6:
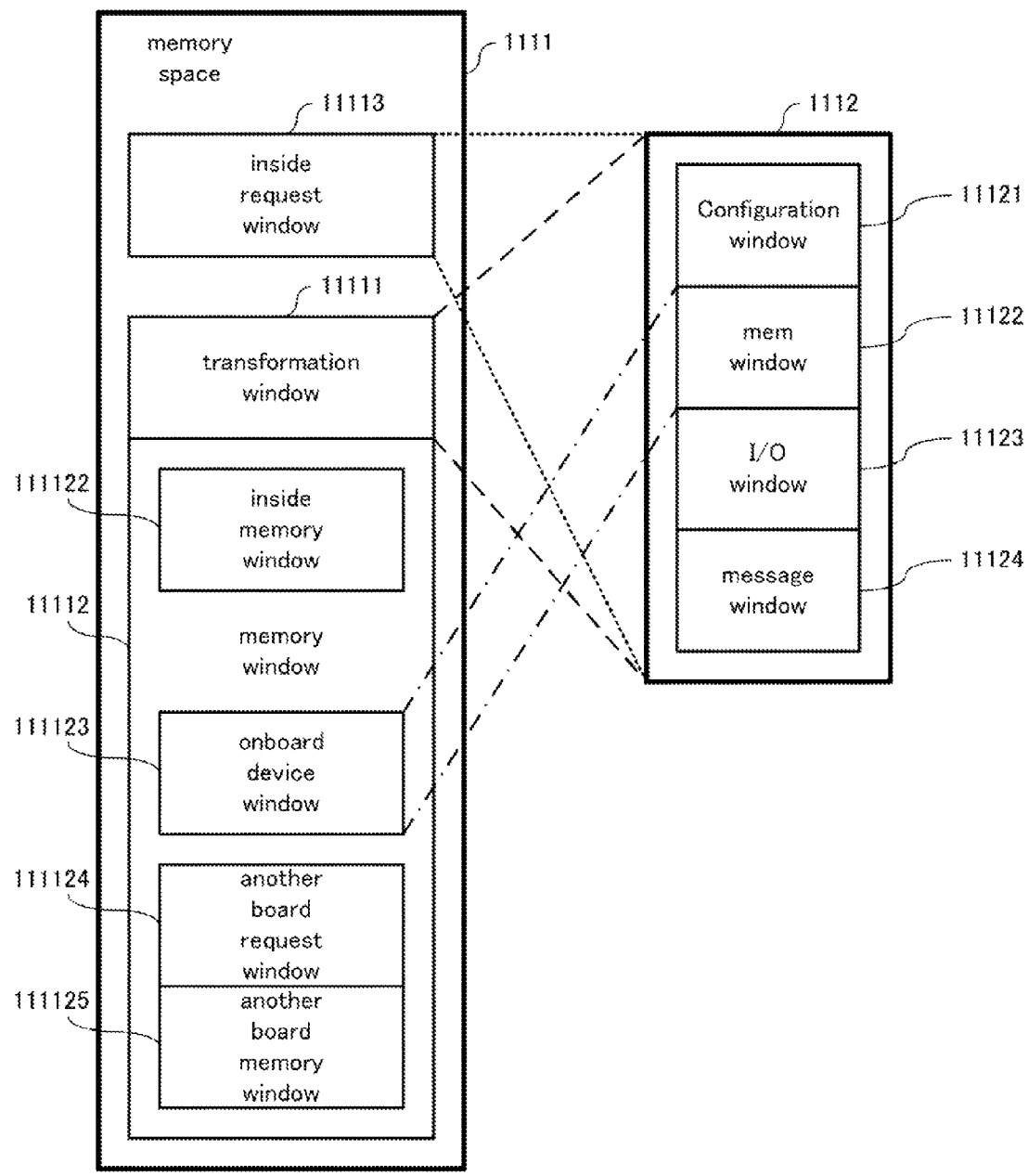
FIG. 6 illustrates an example of the request conversion in a case where a request inputted to a request conversion mechanism is hit in a memory window.

FIG. 6 illustrates an example of the request conversion in a case where, among the requests inputted to the request conversion mechanism 1112, the request is hit in the memory window 11123. In FIG. 6, among the requests hit in the inside request window 11113 or the transformation window 11111, the address space of the request hit in the memory window 11123 is converted into the address space of the onboard device window 111123 in the request conversion mechanism 1112, and the request is sent to the end device 15. Note that it is also possible to directly control the end device 15 from the CPU 121 by directly accessing the space of the onboard device window 111123.

While the structure on the board 1 side has been described in FIGS. 2 to 6, the structure on the board 2 side is similar to that on the board 1 side. In the thus-structured boards 1 and 2, a description is given as an example of an operation in which the lower-level device in the network on the board 1 side is controlled from the CPU 221 as the upper-level device in the network on the board 2 side.

First, the CPU 221 issues a memory request in which an address in the range of an another board request window 211124 in the memory window 21112 of a request reception mechanism 2111 is set. When receiving the request corresponding to the space allocated to the another board request window 211124, the request reception mechanism 2111 sends the request to the PCI Express bridge 24 via the PCI Express switch 23. The PCI Express bridge 24 performs the address conversion in which the address space of the request is converted into the space of the transformation window 11111 on the board 1 side by the NTB conversion.

The memory request having been subjected to the address conversion into the space of the transformation window 11111 is transferred to the board 1 side via the NTB 441. The memory request having been transferred to the board 1 side is sent to the request reception mechanism 1111 via the PCI Express bridge 14 and the PCI Express switch 13.

Since the address of the received memory request is in the address range of the transformation window 11111, the request reception mechanism 1111 sends the request to the request conversion mechanism 1112.

The request conversion mechanism 1112 converts the received memory request into one of the configuration request, the memory request, the I/O request, and the message request in accordance with the address of the request. For example, when the address of the received memory request is in the address range of the configuration window 11121, the request conversion mechanism 1112 generates the configuration command as illustrated in FIG. 5 from the request, and sends the configuration command to the lower-level device. In this manner, it is possible to control the lower-level device in the network on the board 1 side from the CPU 221 of the board 2 without the intervention of the CPU 121 of the board 1. The same applies to a case where the network on the board 2 side is controlled from the board 1 side.

Figure 7:
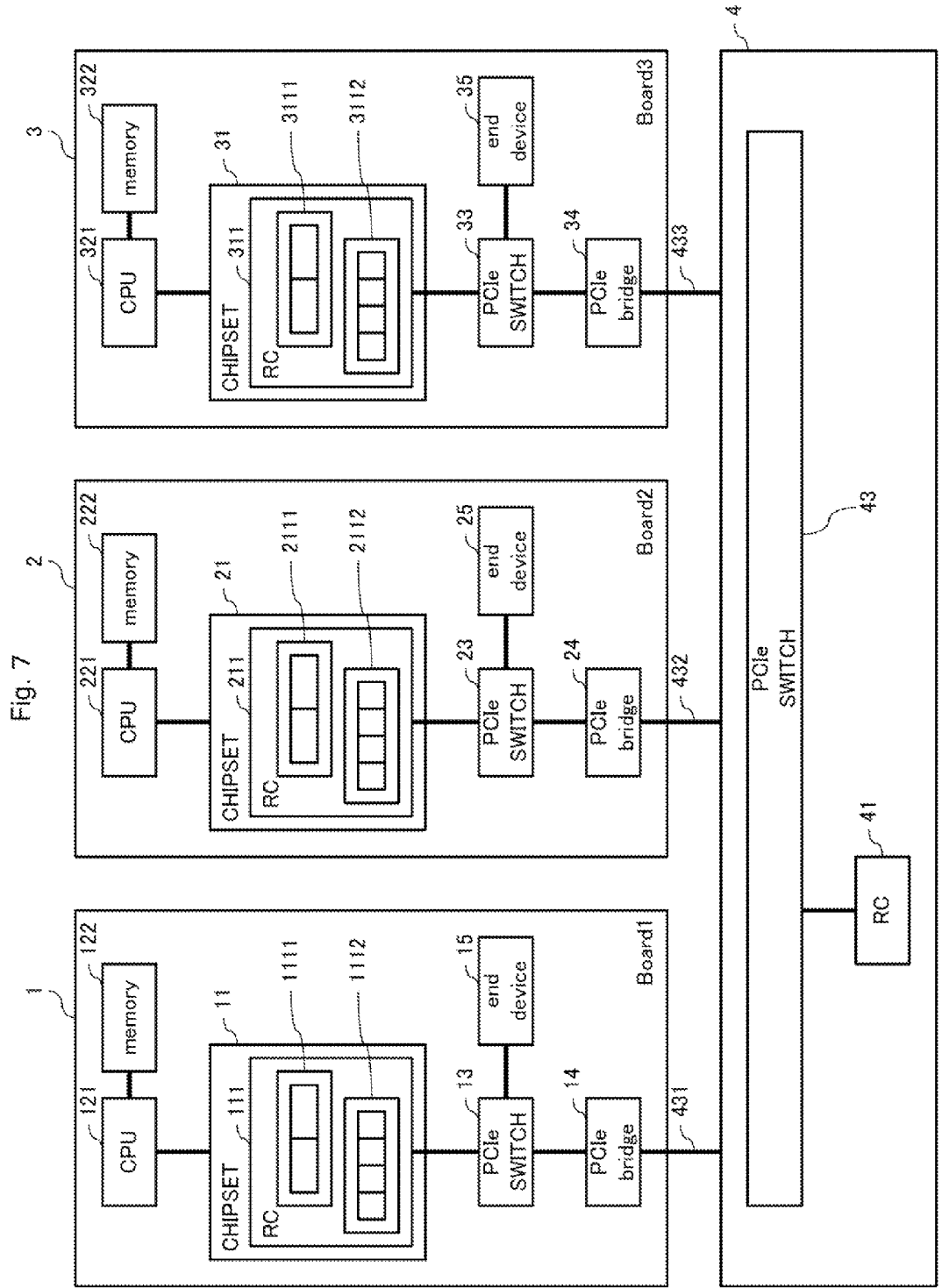
FIG. 7 illustrates a structure of a PCI Express network system in a second exemplary embodiment of the present invention.

FIG. 7 illustrates a structure of a PCI Express network system in a second exemplary embodiment of the present invention. In FIG. 7, boards 1 to 3 are connected to a PCI Express switch board 4. The boards 1 to 3 are connected to a PCI Express switch 43 via PCI Express bridges 14, 24, and 34. In addition, on the board 1, the route complex 111 including the above-described request reception mechanism 1111 and request conversion mechanism 1112 is implemented. The same applies to the boards 2 and 3.

Figure 8:
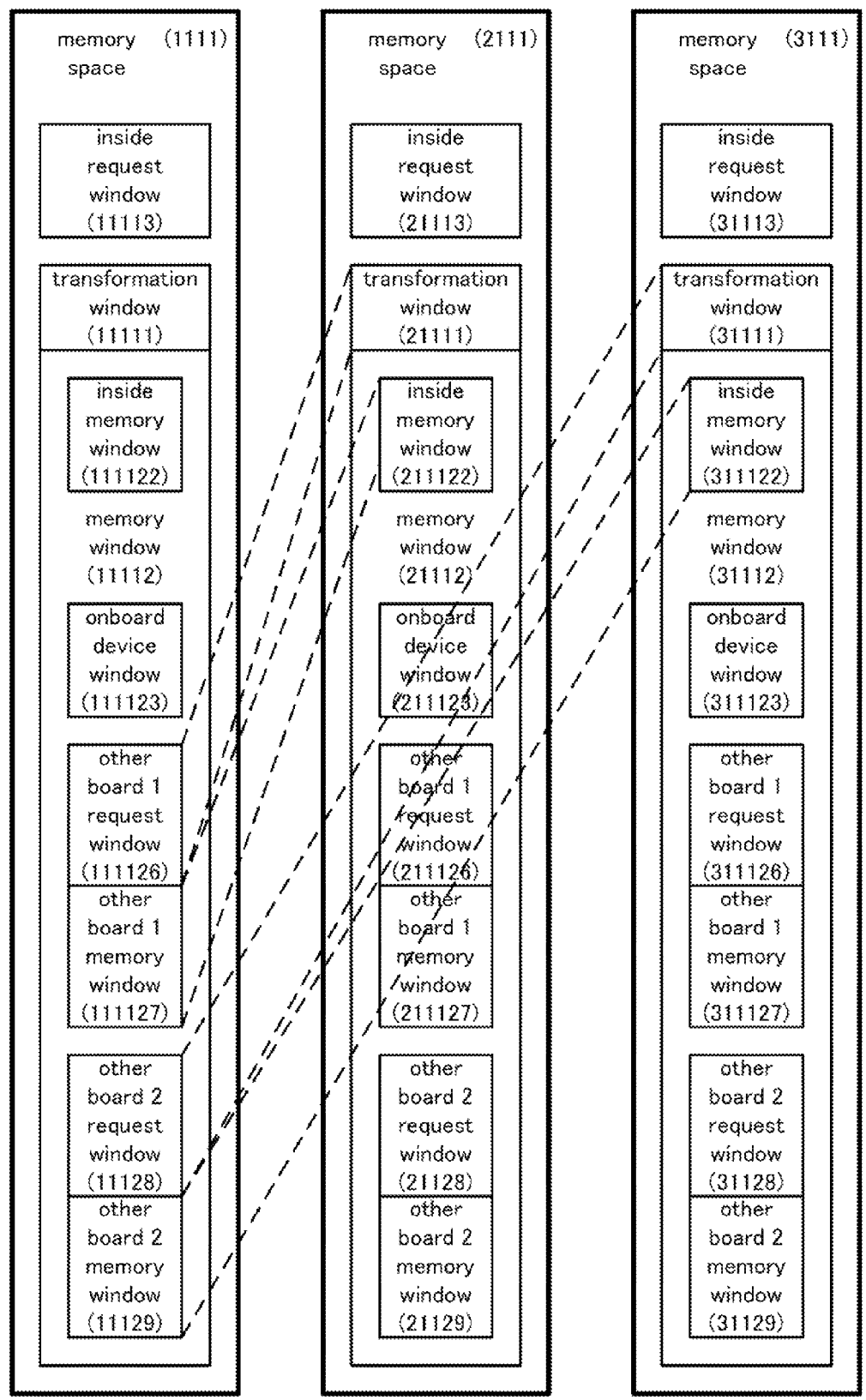
FIG. 8 illustrates an example of address conversion.
Figure 9:
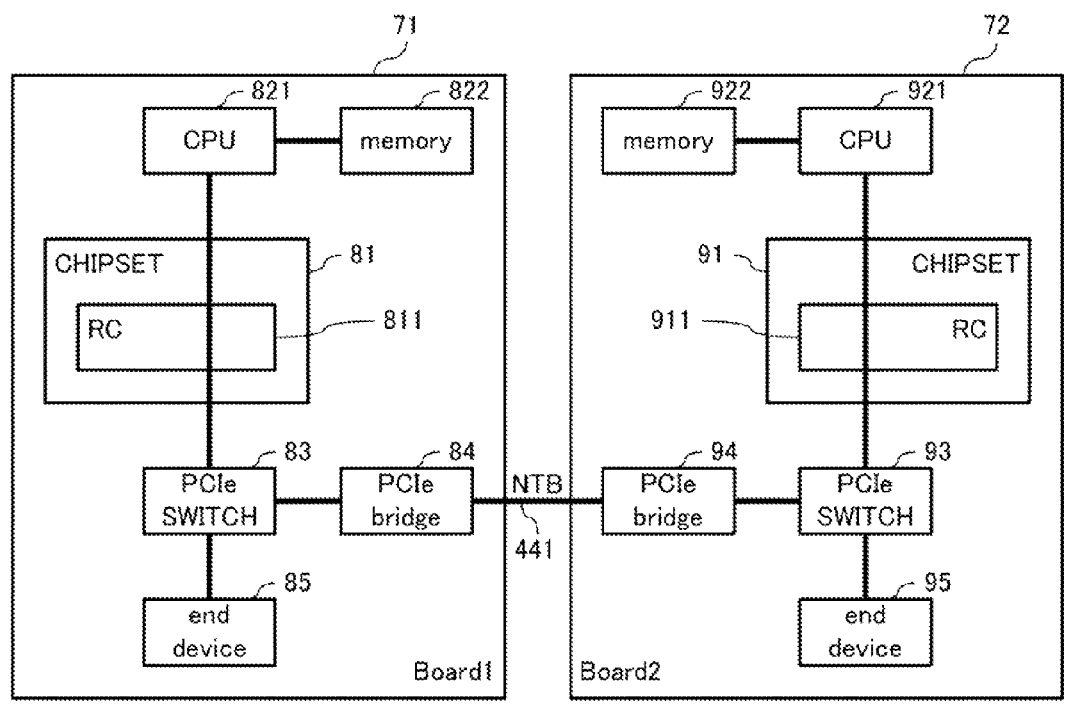
FIG. 9 illustrates an example of a structure of a typical PCI Express network system.

FIG. 8 illustrates an example of the address conversion in the structure of FIG. 7. In FIG. 8, in the address space of the board 1, as the space for accessing the board 2, an other board 1 request window 111126 and an other board 1 memory window 111127 are allocated. In addition, as the space for accessing the board 3, an other board 2 request window 111128 and an other board 2 memory window 111129 are allocated.

The request hit in the other board 1 request window 111126 is sent to the transformation window 21111 of the board 2 using the address conversion of the NTB. The request hit in the other board 1 memory window 111127 is sent to the inside memory window 211122 of the memory window 21112 of the board 2 using the address conversion of the NTB.

The request hit in the other board 2 request window 111128 is sent to a transformation window 31111 of the board 3 using the address conversion of the NTB. The request hit in the other board 2 memory window 111129 is sent to an inside memory window 311122 of a memory window 31112 of the board 3 using the address conversion of the NTB.

Similarly, as the memory space for accessing the board 1 and the board 3 from the board 2, an other board 1 request window 211126, an other board 1 memory window 211127, an other board 2 request window 211128, and an other board 2 memory window 211129 are allocated.

The request hit in the other board 1 request window 211126 is sent to the transformation window 31111 of the board 3 using the address conversion of the NTB. The request hit in the other board 1 memory window 211127 is sent to the inside memory window 311122 of the memory window 31112 of the board 3 using the address conversion of the NTB.

The request hit in the other board 2 request window 211128 is sent to the transformation window 11111 of the board 1 using the address conversion of the NTB. The request hit in the other board 2 memory window 211129 is sent to the inside memory window 111122 of the memory window 11112 of the board 1 using the address conversion of the NTB.

Similarly, as the memory space for accessing the board 1 and the board 2 from the board 3, an other board 1 request window 311126, an other board 1 memory window 311127, an other board 2 request window 311128, and an other board 2 memory window 311129 are allocated.

The request hit in the other board 1 request window 311126 is sent to the transformation window 11111 of the board 1 using the address conversion of the NTB. The request hit in the other board 1 memory window 311127 is sent to the inside memory window 111122 of the memory window 11112 of the board 1 using the address conversion of the NTB.

The request hit in the other board 2 request window 311128 is sent to the transformation window 21111 of the board 2 using the address conversion of the NTB. The request hit in the other board 2 memory window 311129 is sent to the inside memory window 211122 of the memory window 21112 of the board 2 using the address conversion of the NTB.

Thus, with the address conversion in the NTB and the request conversion in the route complex, it becomes possible to control the end device of any board from any CPU of the three boards.

The first and second exemplary embodiments of the present invention have been described above. According to the exemplary embodiments, it is possible to convert the memory request from the lower-level device into the configuration request from the CPU as the upper-level device. Consequently, it is possible to control the lower-level device in the network from the upper-level device in another network connected to the network by the non-transparent connection. For example, in the structure illustrated in FIG. 1, it becomes possible to control the end device 15 of the board 1 from the CPU 221 of the board 2 without the intervention of the CPU 121 of the board 1. In addition, it becomes possible to control the end device 25 of the board 2 from, e.g., the CPU 121 of the board 1 without the intervention of the CPU 221 of the board 2. Similarly, in, e.g., the structure illustrated in FIG. 7 as well, it is possible to control the end device of a board from the CPU of another board connected to the board by the non-transparent connection without the intervention of the CPU of the board.

Therefore, according to the exemplary embodiments, even in a case where processing of a CPU is stopped such as the case of a stall or a reboot, another CPU on the PCI Express network system performs the processing instead of the CPU, whereby it becomes possible to continue the processing without stopping the device connected by a PCI Express connection.

In addition, according to the exemplary embodiments, in accordance with the address of the memory request, it is possible to convert the memory request into the I/O request, the memory request, or the message request in addition to the configuration request.

Further, according to the exemplary embodiments, when the converted request outputs the completion, it is possible to convert the completion into the completion for the memory request, and return the completion to the sending source of the memory request.

Furthermore, according to the exemplary embodiments, it is possible to generate the configuration request by using a part of the address of the memory request from the lower-level device. Consequently, in the CPU in the network from which the memory request is sent, it is possible to easily control the configuration request which is sent to the end device in another network.

Note that the exemplary embodiments are for facilitating understanding of the present invention and are not for interpreting the present invention restrictively. The present invention can be altered or improved without departing from the gist thereof, and the present invention includes its equivalents.

For example, in the structure illustrated in FIG. 1, although the structures of the networks in the boards 1 and 2 are identical with each other, the structures of the networks in the individual boards may be different from each other.

In addition, in, e.g., the network system illustrated in FIG. 7, although three boards on which the PCI Express networks are implemented are connected using the PCI Express switch, the number of boards is not limited to three, and the present invention can be similarly applied to the structure of four or more boards.

The whole or part of the exemplary embodiments can be described as, but not limited to, the following supplementary notes.

Supplementary Note 1

A communication control apparatus for controlling communication between an upper-level device and a plurality of lower-level devices includes: a request reception unit configured to receive a memory access request from a first lower-level device among the lower-level devices; and a request conversion unit configured to convert the memory access request into a setting request from the upper-level device to a second lower-level device among the lower-level devices when an address of the memory access request is an address in a given range, the second lower-level device corresponding to the address of the memory access request.

Supplementary Note 2

In the communication control apparatus according to Supplementary Note 1, the request conversion unit is configured to convert the memory access request into the setting request, an I/O request, a memory access request, or a message request in accordance with the address of the memory access request.

Supplementary Note 3

The communication control apparatus according to Supplementary Note 1 further includes: a completion notification reception unit configured to receive a completion notification for the setting request from the second lower-level device; and a completion notification conversion unit configured to convert the completion notification into a completion notification for the memory access request from the first lower-level device.

Supplementary Note 4

In the communication control apparatus according to Supplementary Note 1, the request conversion unit is configured to generate the setting request by using a part of the address of the memory access request.

Supplementary Note 5

The communication control apparatus according to Supplementary Note 1 is a route complex which is connected to the upper-level device and the lower-level devices via a bus in conformity with a PCI Express standard.

Supplementary Note 6

A network includes: an upper-level device; a plurality of lower-level devices; a communication control apparatus configured to control communication between the upper-level device and the lower-level devices; and a bridge configured to connect the communication control apparatus to another network by a non-transparent connection, wherein the communication control apparatus includes: a request reception unit configured to receive a memory access request from the other network via the bridge; and a request conversion unit configured to convert the memory access request into a setting request from the upper-level device to a lower-level device among the lower-level devices when an address of the memory access request is an address in a given range, the lower-level device corresponding to the address of the memory access request.

Supplementary Note 7

A network system includes a plurality of networks each of which includes: an upper-level device; a plurality of lower-level devices; a communication control apparatus configured to control communication between the upper-level device and the lower-level devices; and a bridge configured to connect the communication control apparatus to another network by a non-transparent connection, wherein the communication control apparatus in each of the networks includes: a request reception unit configured to receive a memory access request from the other network via the bridge; and a request conversion unit configured to convert the memory access request into a setting request from the upper-level device to a lower-level device among the lower-level devices when an address of the memory access request is an address in a given range, the lower-level device corresponding to the address of the memory access request.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

I claim:

1. A communication control apparatus for controlling communication between an upper-level device and a plurality of lower-level devices in a first network, comprising:
   a request reception unit configured to receive a memory access request from the upper-level device in the first network or a first lower-level device among the lower-level devices in the first network, the first lower-level device connected to a second network by a non-transparent connection; and
   a request conversion unit configured to convert the memory access request into a setting request from the upper-level device in the first network to a second lower-level device among the lower-level devices in the first network when an address of the memory access request is an address in a given range, the given range being different from an address range for an access from the upper-level device in the first network to the plurality of lower-level devices in the first network, the second lower-level device corresponding to the address of the memory access request.

2. The communication control apparatus according to claim 1, wherein the request conversion unit is configured to convert the memory access request into the setting request, an I/O request, a memory access request, or a message request in accordance with the address of the memory access request.

3. The communication control apparatus according to claim 1, further comprising:

a completion notification reception unit configured to receive a completion notification for the setting request from the second lower-level device; and a completion notification conversion unit configured to convert the completion notification into a completion notification for the memory access request from the first lower-level device.

4. The communication control apparatus according to claim 1, wherein the request conversion unit is configured to generate the setting request by using a part of the address of the memory access request.

5. The communication control apparatus according to claim 1, wherein the communication control apparatus is a route complex which is connected to the upper-level device and the lower-level devices via a bus in conformity with a PCI Express standard.

6. A network, comprising:
an upper-level device;
a plurality of lower-level devices;
a communication control apparatus configured to control communication between the upper-level device and the lower-level devices; and
a bridge configured to connect the communication control apparatus to another network by a non-transparent connection, wherein
the communication control apparatus includes:
    a request reception unit configured to receive a memory access request from the other network via the bridge; and
    a request conversion unit configured to convert the memory access request into a setting request from the upper-level device to a lower-level device among the lower-level devices when an address of the memory access request is an address in a given range, the given range being different from an address range for an access from the upper-level device to the plurality of lower-level devices, the lower-level device corresponding to the address of the memory access request.

7. A network system, comprising:
a plurality of networks each of which includes:
    an upper-level device in a first network;
    a plurality of lower-level devices in the first network, including a first lower-level device connected to a second network by a non-transparent connection;
    a communication control apparatus configured to control communication between the upper-level device and the lower-level devices; and
    a bridge configured to connect the communication control apparatus to another network by a non-transparent connection, wherein
the communication control apparatus in each of the networks includes:
    a request reception unit configured to receive a memory access request from the other network via the bridge; and
    a request conversion unit configured to convert the memory access request into a setting request from the upper-level device in the first network to a lower-level device among the lower-level devices in the first network when an address of the memory access request is an address in a given range, the given range being different from an address range for an access from the upper-level device in the first network to the plurality of lower-level devices in the first network, the lower-level device corresponding to the address of the memory access request.

\* \* \* \* \*